L. S. LACHMAN.
PROCESS OF ELECTRICALLY UNITING METALLIC MEMBERS.
APPLICATION FILED OCT. 19, 1910.
1,133,806.
Patented Mar. 30, 1915.
2 SHEETS—SHEET 1.
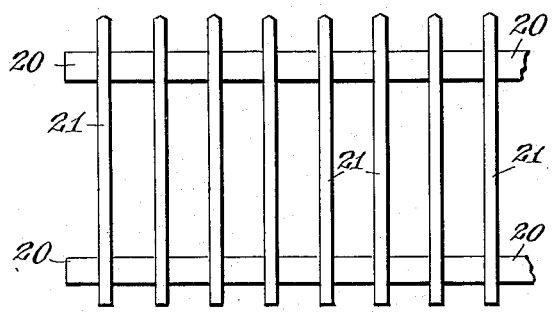
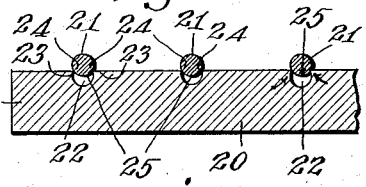
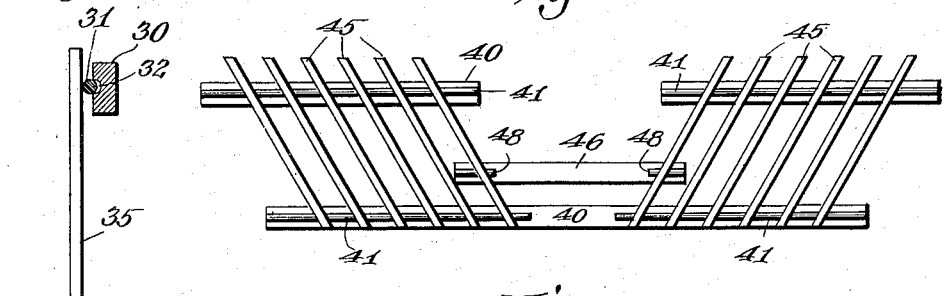
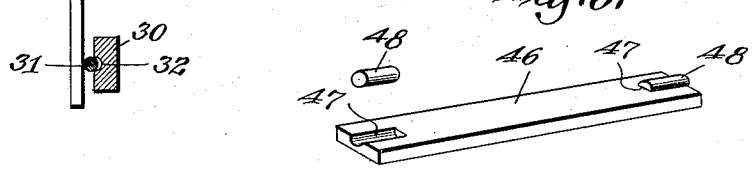
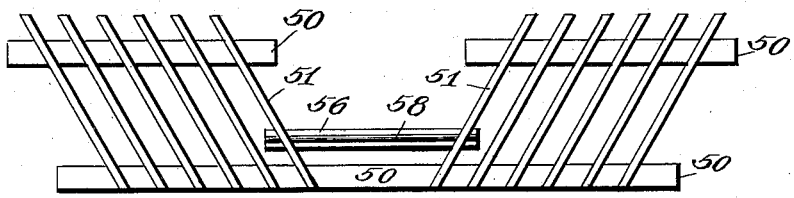
WITNESSES
A. C. O'Connell
J. Richards
INVENTOR
L. S. Lachman
BY
ATTORNEY L. S. LACHMAN.
PROCESS OF ELECTRICALLY UNITING METALLIC MEMBERS.
APPLICATION FILED OCT. 19, 1910.
1,133,806.
Patented Mar. 30, 1915.
2 SHEETS—SHEET 2.
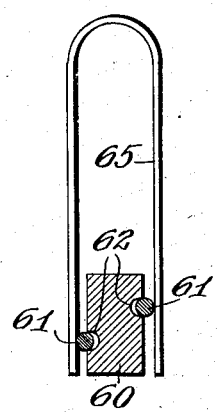
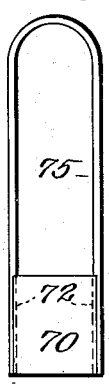
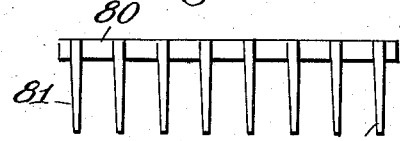
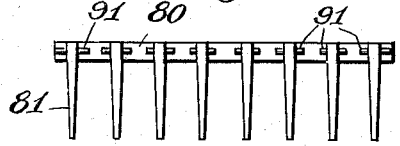
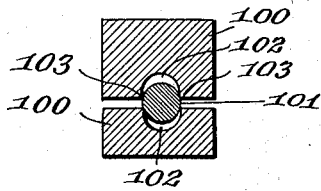
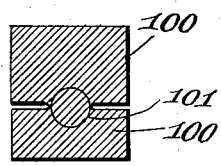
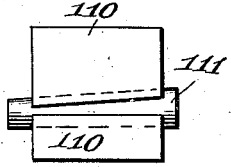
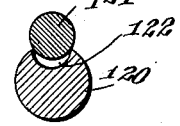
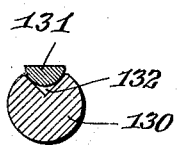
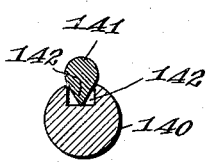
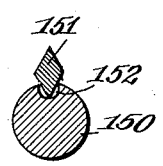

UNITED STATES PATENT OFFICE.

LAURENCE S. LACHMAN, OF NEW YORK, N. Y.

PROCESS OF ELECTRICALLY UNITING METALLIC MEMBERS.

1,133,806.  Specification of Letters Patent.  Patented Mar. 30, 1915.

Application filed October 19, 1910. Serial No. 587,795.

*To all whom it may concern:*

Be it known that I, LAURENCE S. LACHMAN, a citizen of the United States, and a resident of the city, county, and State of New York, have invented certain new and useful Improvements in Processes of Electrically Uniting Metallic Members, of which the following is a specification.

This inventiton relates to processes of electric welding, and has for one of its main purposes the provision of a process whereby the intersecting portions of members may be integrally united electrically in a most economical and secure manner. This and other purposes of the invention, which will fully appear from the hereinafter description are obtained from the various exemplifications of the invention selected to typify some of the many various forms which it may take without departure from its spirit, or its scope as defined by the subjoined claims.

In the accompanying drawings, wherein similar characters of reference designate similar parts in all the views:—Figure 1 is a plan view of a part of a frame or structure whose members are integrally united in accordance with the present process. Fig. 2 is an enlarged view showing the position of the members when they are placed together for welding. Fig. 3 is also an enlarged view showing the position of the members when the welding operation has been completed. Fig. 4 is a view illustrating members prepared and arranged for union to form a frame different from the preceding one, in accordance with the present invention. Fig. 5 is a side view of yet another frame formed in accordance with the present invention. Fig. 6 is a perspective view of certain members of the frame shown in Fig. 5. Fig. 7 is a side view of a further frame formed in accordance with the present invention. Fig. 8 is a detail view of one of the members thereof. Fig. 9 is a view, partly in vertical transverse section, showing members relatively arranged for integral union electrically to produce a frame of yet a different form from any preceding. Fig. 10 is a like view illustrative of a slightly different process for forming a frame of the type shown in Fig. 9. Fig. 11 is a detail view of one of the members shown in Fig. 10. Fig. 12 is a view showing a further form of article or frame produced in accordance with the present process. Fig. 13 is a plan view of one member thereof. Fig. 14 is a view illustrative of a slightly different process by which an article or frame of the type shown in Fig. 12 may be produced according to the present process. Fig. 15 is a view in vertical section showing members relatively arranged for integral union electrically to produce an article or frame of yet another form. Fig. 16 is a similar view showing the article when its members have been integrally united. Fig. 17 is a view illustrative of a slightly different process of producing the article or frame shown in Fig. 16. Fig. 18 is a sectional view illustrative of one of many other forms of a member which may be employed in carrying the invention into practice. Fig. 19 is a like view showing other forms of groove and a member which may be employed. Fig. 20 is a like view showing a further modification of one of the members. Fig. 21 is another like view showing another modification.

In all of the various embodiments of the invention there are two members which, as an initial step of the process, are suitably prepared for electrical integral union. The preparation of one of these members, hereinafter arbitrarily designated "first member," consists in forming it with one or more pairs of welding portions of which those of each pair are separated by a groove or recess. These welding portions, in the herein exemplifications of the invention are formed by providing said member with a groove or recess, whereby at opposite sides of the mouth thereof welding places, preferably pointed, are formed by the junctions of the surface of the member with the wall or walls of the groove or recess. This will be understood upon reference to Fig. 2 of the appended drawings, wherein 20 designates the member referred to, 22 its groove or recess and 23 its welding points or places. The preparation of the other of the members referred to hereinafter arbitrarily termed "second member," consists in so forming or preparing it that it will rest upon the welding places of the first-referred to member and present thereto places suitable for electrical weldable union therewith, and also have between its said places a portion which is free from contact with the bottom of the groove or recess, until the two members have been welded together. This is well exemplified in Fig. 2, in which 21 represents said member, 24, its places for contact with the welding points or places, 23, of the other member, and 25 its portion between said places 24. These members are then suitably placed together, as exemplified in Fig. 2, with the second-referred to member resting at its diametrically opposite places 24 upon the welding points or places 23 adjacent to the groove of the other and its portion 25 projecting into but not filling said groove. The members are now ready for weldable union with each other: and this union is brought about by passing a current of electricity through the contacting places referred to, as shown by the arrow in Fig. 2, and simultaneously or subsequently subjecting one of said members to pressure toward the other, or both to pressure toward each other. As the result of these combined heating currents and pressure, the welding places 23 and 24 and sometimes the portion 25 within the groove 22, melt or attain a welding heat, so that their molecules coalesce, and the member 21 is brought to a full seat in said groove, whereby the groove is filled and the member 21 becomes embedded in the member 20 and an integral part thereof, all before the current has been dissipated as a consequence of the bringing of the member 21 to its full seat within said groove (see Fig. 3) and hence into such electrical contact with the member 20 as to provide a path for the current which destroys or minimizes its heating effect.

Any suitable means may be employed for passing the welding current through the contacting portions of said members and for subjecting the latter to pressure, and as such are now well known and particular ones thereof form no part of the present invention, it is considered to be unnecessary to disclose the same herein.

The "first member" and the "second member" each may be of various shapes and sizes, and variously relatively located with respect to each other, to suit the various preferences and the requirements of various articles which may be produced according to the present invention. There may be one or more "first members" and one or more "second members" in each article or structure, and they may be arranged in various relative positions according to various preferences and the requirements of the article to be produced. There may also be "third members" and even "fourth members" and also additional members, variously relatively arranged and of various sizes, shapes and numbers to accord with various preferences and requirements.

In the accompanying drawings there are illustrated a number of different embodiments of the invention typifying some of the innumerable various shapes, numbers and relative arrangements of the parts contemplated to be within the spirit and scope of the invention.

The particular embodiment illustrated in Figs. 1, 2 and 3 may be arbitrarily denominated an example of a two-member embodiment. They represent a portion of a frame or fabric well adapted to serve as a reinforcement for concrete, and other purposes, in different stages of its manufacture according to the present invention. This frame or fabric comprises a pair of spaced "first members" 20, formed of bars joined by a series of spaced "second members" 21 in accordance with the process hereinbefore fully referred to. In this particular exemplification, the grooves or recesses 22 extend across the member 20 and each has a curved wall and a restricted mouth; and the members 21 are shown as rods which are circular in cross section, and of such size as to rest at diametrically opposite places upon the member 20, at the mouth of the grooves in the latter, respectively, and to project partway into said grooves, with their portions 25 confronting but free from contact with the walls thereof. These relative shapes and sizes of the grooves 22 and the members 21 are such as properly to go together, but the invention is nowise restricted thereto, nor is it restricted to a disposition of the grooves transversely of the member 20, as will hereinafter fully appear. In this, as in all of the exemplifications of the invention, hereinafter given, the parts of the entire frame or fabric may be completely assembled before the welding step, and the welding together of all the parts may be carried out simultaneously, or at a single operation: or the parts may be completely assembled and the junctions welded one at a time; or the parts may be placed together and welded, one at a time, or otherwise, as preferred.

In Fig. 4, there is exemplified a frame or fabric suitable for a concrete reinforcement or other purposes, having a "third member". In this particular exemplification the spaced "first members", marked 30, have longitudinal grooves, marked 32, and the "second members", marked 31, are assembled in relation to said grooves in a manner analogous to that already described, except that they extend longitudinally of the grooves. The longitudinal members of the frame or reinforcement, composed in this particular instance of the "first" and "second" members 30 and 31, are connected with each other by the "third member" marked 35, which intersects the portions of the "second members" which protrude from the grooves or recesses. These "second members" and the "third members" are each shown as round rods, but other suitable forms capable of being weldably united electrically may be employed. In practice, a series of such "third members" are preferably employed, and they may be disposed at right angles with the members 30 or at any other suitable angle therewith.

In Fig. 5 there is given an exemplification of another form of frame, particularly adapted for use as a concrete reinforcement embodying several members. In this particular exemplification, there is a first member, marked 40, extending the full length of the frame and a pair of other "first members" each also marked 40 arranged parallel with the one first-mentioned and disposed at the ends of the frame with a space between their ends. These "first members" are each provided with "second members" marked 41, extending longitudinally thereof, and the "third members" marked 45 are welded to the latter, all as before described. A "first member" marked 46, extending longitudinally across the space between the "third members" 45 at the inner ends of the short or separated "first members," 40 has its ends provided with grooves or recesses 47 for "second members", marked 48, shown as round rods or pins, for weldable union with said "third members." The "first" and "second" members 46 and 48 are shown in detail in Fig. 6.

In Fig. 7 there is shown a reinforcing frame like that of Fig. 5, with the exception that the "first members" marked 50, have transverse grooves 52 (Fig. 8) for the ends of the second members, marked 51, which in this form connect the "first members" with each other as in Fig. 1. The other longitudinal members, marked 56 and 58 are identical with the members 46 and 48 of Fig. 5.

In Fig. 9 the invention is exemplified in connection with a frame or structure, in which there are loops or straps. This is a three-member form, the "first member" being marked 60, the second 61, and the third, which is the loop or strap referred to, being marked 65; the ends of the latter being welded to the "second members" which are in longitudinal grooves or recesses 62 formed in opposite sides of the "first member" as before described. In Figs. 10 and 11, however, a similar form of reinforcement is shown in which the first member, marked 70, has transverse grooves or recesses 72 on its opposite sides, forming welding portions 73 and seats for the ends of the loop or strap 75, the member 61 of the other form being dispensed with. Preferably, the ends of the loops or straps 65 and 75 are rounded.

In Fig. 12 there is exemplified a form of device embodying the present invention, in which there is only one "first member;" marked 80, and several "second members," marked 81. The particular device shown is a rake-head, but obviously there are many other devices having a like arrangement of elements, in connection with which the invention may be equally as well applied. While this character of device is exemplified in Fig. 12 in a two-member form, yet obviously, it may be a three-member form as shown in Fig. 14 wherein the third member may be short pieces, marked 91, as herein shown, or may be a continuous member, like that marked 41 in Fig. 6, as described.

In Figs. 15 and 16 there is exemplified a structure wherein a plurality of bars or layers, forming "first members" are united face to face by a rod, forming a "second member" arranged between them and welded in a seat formed in each. Each "first member" or layer is marked 100 and is formed with one or more grooves 102, forming welding points or places 103 and seats for the contiguous parts of the "second member," marked 101, which is welded to both of the members 100, as shown in Fig. 15. This "second member" may be continuous throughout the other members or be formed of a series of separated sections as preferred. In this particular form the grooves extend lengthwise of their members, but they may extend across the same, if desired, as shown in Fig. 17, in which each "first member" or layer is marked 110 and the uniting or "second member" is marked 111.

In all of the examples hereinbefore particularly referred to, the "first members" are bars angular in cross section, but this is not essential as they may be round or of any suitable shape. An example of this is given in Fig. 18, wherein the "first member," marked 120, is shown as a rounded bar. The "second member" 121 may also be a round bar. Nor is it essential that the grooves or recesses 122 in the first member be approximately of semi-circular or U-shape, as they may be of many different approved shapes: approximately V-shaped ones being shown in Fig. 19 and square in Fig. 20, as an example, and marked 132 and 142, while an approximately U-shaped one, marked 152 is shown in Fig. 21. While these forms of grooves are exemplified in rounded "first members," marked 130, 140 and 150 in said figures, respectively, it is apparent that they may equally as well be embodied in "first members" of angular or other cross sectional shape. Again, it is not essential that the "second members" be round rods: a half round rod, marked 131, being shown in Fig. 19, a rod 141 with a protruding projection 142 being shown in Fig. 20 and a diamond-shaped rod, marked 151, being shown in Fig. 21 as examples of other forms of "second members" which may be employed. Moreover, it is nowise essential that the first members be flat groove bars, as U-bars, V-bars as many other shapes of bars, and the like, many or all of which are now well known and are in use for structural and other purposes, are capable of use in the present process. In short, the several members and the grooves may be of any suitable shape, the only essential being that they be suitable for the particular use to which the article produced is to be applied and that the grooves of the "first members" and the portions of the "second members" which are adjacent thereto and are to be welded to the wall or walls thereof be correlatively of such shape that said portions of the "second members" and the welding points or places substantially forming parts of said walls will receive a welding heat and be weldably united under the influence of an electrical current and pressure within commercially practicable limits of strength.

Having now described the invention, what I believe to be new and desire to secure by Letters Patent, is:—

1. The process which consists in preparing a member with a plurality of spaced welding places; so preparing a second member as to adapt it for integral electrical union therewith; placing the second member in such relation to the first-mentioned member that opposite portions thereof will be in contact with the welding places of the first-mentioned member; and subjecting the contacting parts of the members to a welding current of electricity and the members to relative pressure.

2. The process which consists in so preparing a member that it will have a plurality of spaced welding places; so preparing a second member as to adapt it for integral electrical union therewith; placing the second member in such relation to the first member that portions thereof will be in contact with the welding places of the first-mentioned member and its part intermediate of said places will be free from contact with the first-mentioned member; and subjecting the contacting parts of the members to a welding current of electricity and the members to relative pressure adapted to cause coalescence of molecules of the members and bring the portions of the members which are between said contacting portions into contact with each other.

3. The process which consists in preparing a first member with a groove and with welding places adjacent to the groove; placing in operative relation with the first member a second member having portions which respectively contact with said welding places and are free from contact with a portion of the wall of the groove between said places; and subjecting the contacting parts of the members to a welding current of electricity and the members to relative pressure, adapted to cause coalescence of molecules of the members and to force the second member to a full seat in the groove of the first member.

4. The process which consists in mounting over the mouth of a groove in a first member, having welding places at its mouth, a second member which engages said welding places and presents to the wall of the groove a portion which is free from contact therewith; and subjecting the members to a welding current of electricity and pressure until their said confronting non-contacting portions have been brought into contact with each other.

5. The process which consists in mounting in suitable relation with an open groove in the surface of a first member, having welding places adjacent to the groove, a second member having portions which contact with said welding places and presents to the wall of the groove a portion which is free from contact therewith, and integrally uniting these parts together by subjecting them to a welding current of electricity and to relative pressure until their molecules coalesce and the second member has been brought to a seat in the groove below the surface of the first member.

6. The process which consists in forming a member with an open groove, placing upon said member a second member in such relation thereto that opposite portions of the second member will be in contact with portions of the first member at the mouth of the groove and part of the second member, confronting the groove, will be free from contact with the wall of the latter, and subjecting the contacting portions of the members to a welding current of electricity and said members to relative pressure until their said confronting non-contacting portions have been brought into electrical connection with each other.

7. The process which consists in providing a member having a groove, and welding places adjacent thereto, and electrically welding to said member within said grooves, a second member which at the commencement of the welding step is so related to the first member that it will have portions which are in contact with the welding places of the first member and other portions which confront the wall of the grooves and are free from contact therewith.

8. The process which consists in providing a member having a groove, and welding places adjacent thereto, and electrically welding to said member within said grooves, a second member which at the commencement of the welding step is so related to the first member that it will have portions which are in contact with the welding places of the first member and other portions which confront the wall of the grooves and are free from contact therewith, the welding step being continued until the latter portions of the second member have been brought into electrical connection with the walls of the grooves, respectively.

9. The process which consists in electrically welding to a grooved bar or the like, a rod having a rounded surface, by so relatively preparing the bar and rod that the bar will have welding places at opposite sides of the mouth of the groove and the rod will have oppositely disposed welding portions distanced apart with relation to the welding places of the bars so as to support the rod across the mouth of said groove, and further so relatively preparing the bar and rod that the wall of the groove of the latter will be free from contact with the surface of the rod between said welding portions at the beginning of the heat and pressure step and will be in contact with the same at the conclusion of said step.

10. The process which consists in forming a member with an open groove extending longitudinally thereof, placing upon said member a second member in such relation thereto that opposite portions of the second member will be in contact with portions of the first member at the mouth of the groove, and part of the second member, confronting the groove, will be free from contact with the wall of the latter, and subjecting the contacting portions of the members to a welding current of electricity and said members to relative pressure until their said confronting non-contacting portions have been brought into electrical connection with each other.

11. The process of weldably uniting two metal members, which consists in forming a groove in one of the members, placing the other member over the groove and in contact with the edges formed by the opening of the groove, raising the temperature of the metal at the points of contact of the two members to a welding heat, and pressing the members toward each other.

12. The process of forming a metal article, which consists in forming a first member with a series of grooves, each having welding places at opposite sides of its mouth, and welding thereto a series of second members so prepared with relation to the first member that each will have opposite welding portions adapted to contact with the welding places of the first member and their surface between their welding places free from contact with the walls of the grooves, and further so relatively prepared that they will be fully seated in the grooves at the completion of the welding step.

13. The process of forming a metal article, which consists in providing a first member, having a longitudinal groove and electrically welding a second member thereto within said groove, and third members to the second members.

14. The process of forming a metal article, which consists in forming a first member with a series of longitudinal grooves, each with welding places at opposite sides of its mouth, electrically welding thereto a second member which has been so prepared that its opposite sides will rest upon said welding places and its surface lying between the same and confronting the groove will be free from contact with the wall of the latter, and further has been so prepared with relation to the groove that it is adapted to be forced to a full seat in the latter, the welding step being continued until the second member has reached such seat, and electrically welding the ends of a series of teeth to the second member.

In witness whereof I have hereunto set my hand at New York, county of New York and State of New York, this 14th day of October 1910.

LAURENCE S. LACHMAN.

In presence of—
EDWARD FULDA,
MARGARET KELLEY.